Sept. 12, 1939.  W. M. ALEXANDER  2,172,782
CHUCK MECHANISM FOR BROACHING STEEL
Filed Dec. 22, 1936
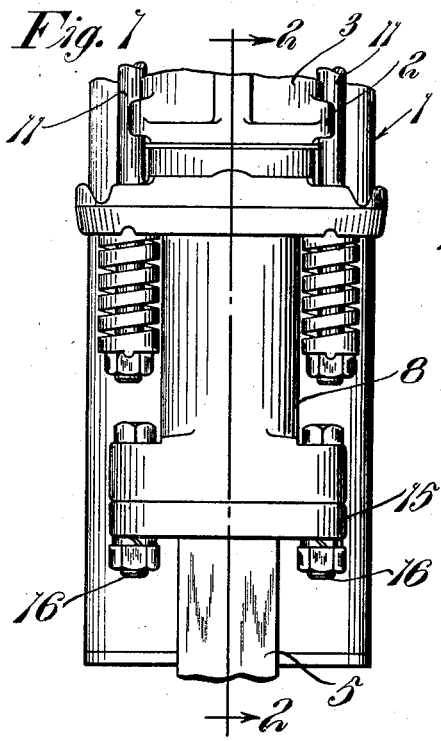
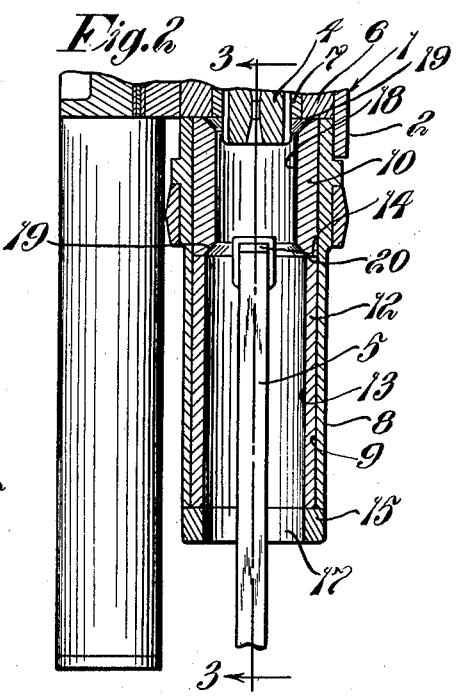
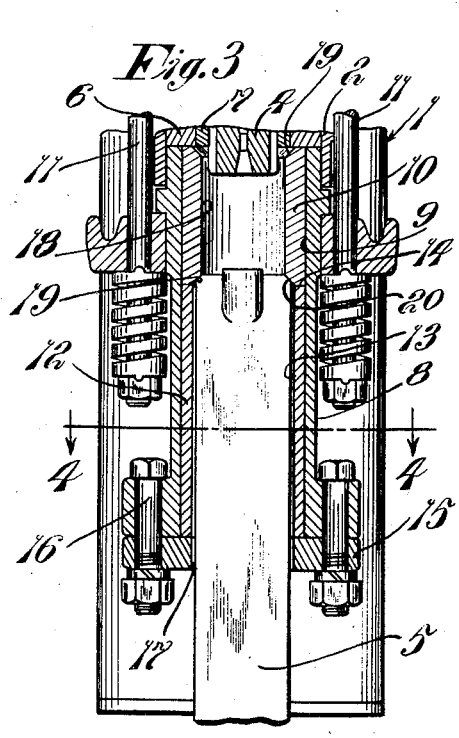
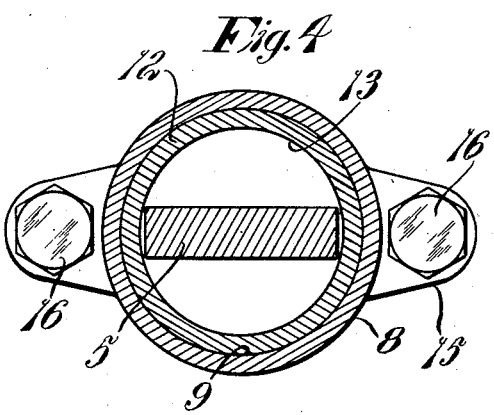
Inventor:
William M. Alexander
by Louis A. Maxson
Atty.

Patented Sept. 12, 1939

2,172,782

UNITED STATES PATENT OFFICE 2,172,782

CHUCK MECHANISM FOR BROACHING STEEL

William M. Alexander, Johannesburg, Transvaal, Union of South Africa, assignor to Sullivan Machinery Company, a corporation of Massachusetts Application December 22, 1936, Serial No. 117,167

7 Claims. (Cl. 121—32)

This invention relates to rock drill chuck mechanisms, and more particularly to improvements in a chuck mechanism for a rock drill broaching steel.

In cutting out blocks of stone in quarries, it is a common practice to drill, by means of a hammer rock drill, a series of holes in the stone, and thereafter to break away the partitions between the holes by means of a broaching steel, substituted in the rock drill for the usual drill steel. The broaching steel acts to break away the partitions between the drilled holes, so that an elongated slot is formed in the stone. During the broaching operation it is desirable for the broaching steel to follow the series of drilled holes which may not be disposed in exact alinement.

An object of this invention is to provide an improveed chuck for a broaching steel of a rock drill of the broaching type. Another object is to provide an improved broaching steel chuck whereby the broaching steel has some freedom of lateral movement in the chuck, so that the steel may follow automatically the series of drilled holes, thereby enabling breaking away of the partitions between the drilled holes in a more effective manner. A further object is to provide an improved broaching steel chuck wherein a sleeve is employed for supporting and guiding the rectangular broaching steel. Yet another object is to provide an improved broaching steel chuck for supporting and guiding the rectangular shank of a broaching steel while, due to the circular bore receiving the steel shank, permitting free rotation of the steel about its longitudinal axis relative to the chuck. Other objects and advantages of the invention will, however, hereinafter more fully appear.

In the accompanying drawing there is shown for purposes of illustration one form which the invention may assume in practice.

In this drawing,

Fig. 1 is a front elevational view of the forward end of a rock drill in which the illustrative form of the improved chuck is incorporated.

Fig. 2 is a view in longitudinal section taken substantially on line 2—2 of Fig. 1.

Fig. 3 is a view in longitudinal section taken substantially on line 3—3 of Fig. 2.

Fig. 4 is an enlarged cross sectional view taken substantially on line 4—4 of Fig. 3.

In this illustrative embodiment of the invention 1 designates a hammer rock drill, herein preferably of the mounted type, including a conventional hammer motor 2 comprising a motor cylinder 3 containing a reciprocatory hammer piston having a front striking bar 4 adapted to deliver impact blows to the shank of a broaching steel 5. Arranged within the forward end of the motor cylinder is a front cylinder head 6 supporting a guide sleeve 7 in which the piston striking bar 4 is guided. Secured to the front end of the motor cylinder is a chuck housing 8, and arranged in the bore 9 of the chuck housing is a sleeve 10 abutting at its rear end the front surface of the motor head 6 of the motor cylinder. The chuck housing is clamped against the front motor head in any suitable manner, as for instance, by usual spring tensioned side bolts 11, these side bolts holding the several parts of the motor in assembled relation in a well known manner.

In this improved construction, the bore 9 of the chuck housing 8 extends completely through the housing and is of uniform cross section throughout its length, as shown in Figs. 2 and 3. The chuck mechanism, provided for the accommodation of the broaching steel shank, comprises in this instance a cylindrical sleeve 12 having a uniform bore 13 of circular cross section extending entirely therethrough, and this sleeve is arranged in the chuck housing bore 9 with its rear end abutting at 14 the front face of the sleeve 10. The chuck sleeve 12 may be loosely mounted in the chuck housing bore 9, but in this instance, the sleeve is positively clamped in position by a collar 15 engaging the front end face of the chuck sleeve and secured as by bolts 16 to the chuck housing. This retaining collar has an opening 17 alined with and preferably of the same diameter as the chuck sleeve bore.

The sleeve 10 serves as an abutment for the rear end of the broaching steel shank, and this sleeve may be made reversible to enable turning thereof end for end within the chuck housing bore so that when wear on the front end occurs the sleeve may be reversed to present an unworn surface; and the ends of the sleeve bore 18 are chamfered at 19 to provide an abutment surface for the inclined side surface 20 of the broaching steel shank.

As shown in Fig. 4, the broaching steel is of rectangular shape in cross section, and when the steel shank is positioned within the chuck sleeve bore, the four corners of the rectangle are in close adjacency with the sleeve bore walls, so that, while slight play is afforded for the steel, the chuck sleeve provides a guide for the steel shank while permitting free rotation of the steel about its longitudinal axis relative to the chuck sleeve. This slight freedom of movement of a steel shank in a lateral direction within the chuck sleeve bore and the free rotary movement of the steel relative to the chuck sleeve permit automatic alinement of the broaching steel with the series of drilled holes during the broaching operation, and the walls of the broaching slot prevent turning of the steel within the sleeve bore during the broaching operation. During the starting of the broaching steel, the operator may manually guide the steel, or if desired, any suitable steel guiding means may be employed.

The broaching steel chuck sleeve 12 may be readily released from the chuck housing bore 9 simply by releasing the holding bolts 16 and removing the retaining collar 15, it then being possible to slide the chuck sleeve axially in a forward direction from the chuck housing bore. It will be seen that the walls of the circular bore of the chuck sleeve not only serve to guide the broaching steel shank edgewise, but also sidewise, while the broaching steel is free to reciprocate and rotate as it is percussively actuated, and since the chuck sleeve is of substantial length a very effective guide is afforded.

The broaching steel may be retained within the chuck sleeve by means of a steel retainer and puller device such as that disclosed in the patent to M. C. Huffman, Patent No. 2,055,898, granted Sept. 29, 1936.

As a result of this invention, it will be noted that an improved chuck mechanism is provided for a rock drill broaching steel whereby by means of a simple and inexpensive chuck sleeve, the broaching steel is guided in an extremely effective manner. It will further be noted that by guiding the broaching steel shank within the bore of the chuck sleeve some freedom of movement both laterally and edgewise of the steel is afforded while the steel is free to rotate about its longitudinal axis relative to the chuck sleeve, so that the broaching steel is automatically alined with the series of drilled holes during the broaching operation. These and other uses and advantages of the improved broaching steel chuck will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a hammer rock drill of the broaching type, the combination with a hammer motor having an impact element, of a front chuck housing having a bore therethrough, a chuck sleeve disposed in said chuck housing bore and having a bore of circular cross section therethrough for receiving the rectangular shank of a reciprocatory broaching steel for positioning the latter to receive the impact blows of the impact element, a broaching steel having a rectangular shank slidably and rotatably received in said chuck sleeve bore, the walls of said circular bore cooperating with the edges of the broaching steel for precluding material lateral movement of the steel relative to the chuck sleeve while guiding the steel during its reciprocatory movement, and means secured to the chuck housing for holding the chuck sleeve in the chuck housing bore, said holding means having an opening alined with the chuck sleeve bore.

2. In a hammer rock drill of the broaching type, the combination with a hammer motor having an impact element, of a front chuck housing having a bore therethrough, a chuck sleeve disposed in said chuck housing bore and having a bore of circular cross section therethrough for receiving the rectangular shank of a reciprocatory broaching steel for positioning the latter to receive the impact blows of the impact element, a broaching steel having a rectangular shank slidably and rotatably received in said chuck sleeve bore, the walls of said circular bore cooperating with the edges of the broaching steel for precluding material lateral movement of the steel relative to the chuck sleeve while guiding the steel during its reciprocatory movement, and means secured to the chuck housing for holding the chuck sleeve in the chuck housing bore, said holding means having an opening alined with the chuck sleeve bore, and said broaching steel of rectangular cross section and the four corners of the rectangle in close adjacency and engageable with the walls of the chuck sleeve bore in the guiding and positioning of the broaching steel.

3. In a hammer rock drill of the broaching type, the combination with a hammer motor having an impact element, of a front chuck housing having a uniform bore extending completely therethrough, a chuck sleeve disposed in said chuck housing bore and having a uniform circular bore therethrough for receiving the rectangular shank of a reciprocatory broaching steel for positioning the latter to receive the impact blows of the impact element, a broaching steel having a rectangular shank slidably and rotatably received in said chuck sleeve bore, the walls of said circular bore cooperating with the edges of the broaching steel for precluding material lateral movement of the steel relative to the chuck sleeve while guiding the steel during its reciprocatory movement, and a detachable collar secured to the chuck housing for holding the chuck sleeve in the chuck housing bore, said collar having a central opening alined with the chuck sleeve bore.

4. In a hammer rock drill of the broaching type, the combination with a hammer motor having an impact element, of a front chuck housing having a bore therethrough, a sleeve arranged within the rearward portion of the chuck housing bore and having a bore within which the forward portion of the impact element is adapted to project, a chuck sleeve disposed in said chuck housing bore and having a uniform circular bore therethrough for receiving the rectangular shank of a reciprocatory broaching steel for positioning the latter to receive the impact blows of the impact element, a broaching steel having a rectangular shank slidably and rotatably received in said chuck sleeve bore, the walls of said circular bore cooperating with the edges of the broaching steel for precluding material lateral movement of the steel relative to the chuck sleeve while guiding the steel during its reciprocatory movement, said first mentioned sleeve serving as an abutment for the rear end of the broaching steel shank, and means secured to the chuck housing for holding the chuck sleeve in the chuck housing bore, said holding means having an opening alined with the chuck sleeve bore.

5. In combination, a chuck mechanism comprising a chuck member having a bore of circular cross section and a broaching steel having a shank of generally rectangular cross section receivable in said chuck member bore, with the four corners of the rectangle in close adjacency to the walls of the bore, the walls of the bore positioning and guiding the steel shank while permitting free rotation of the steel about its logitudinal axis relative to said chuck member.

6. In combination, a chuck mechanism comprising a chuck member having a bore of circular cross section and a broaching steel having a shank of generally rectangular cross section receivable in said chuck member bore, with the four corners of the rectangle in close adjacency to the walls of the bore, the walls of the bore positioning and guiding the steel shank while permitting free rotation of the steel about its longitudinal axis relative to said chuck member, and the steel shank loosely fitting the chuck member, there being a slight clearance between the corners of the rectangular steel shank and the walls of the bore to permit slight edgewise and lateral movements of the steel with respect to the chuck member.

7. In combination, a chuck mechanism comprising a chuck member having a bore of circular cross section, and a reciprocatory broaching steel having a shank of polygonal cross section receivable in said circular bore and having its edges at the corners of the polygon so arranged in close adjacency with the walls of said circular bore that material deviation from its path of reciprocation is precluded, the walls of said circular bore guiding the steel shank during reciprocatory movement of the steel while permitting free rotation of the steel shank within the same relative to said chuck member.

WILLIAM M. ALEXANDER.

CERTIFICATE OF CORRECTION.

Patent No. 2,172,782. September 12, 1939.

WILLIAM M. ALEXANDER.

It is hereby certified that error appears in the printed specification of the above numbered patent requiring correction as follows: Page 1, second column, line 44, for the word "surface" read --surfaces--; page 2, first column, line 74, claim 1, before "an opening" insert --means having--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.